UNITED STATES PATENT OFFICE 2,404,711

POLYMERIZATION PRODUCTS FROM AROMATIC CARBONYL COMPOUNDS AND AROMATIC VINYL COMPOUNDS

Ullrich Hoffmann and Helmut Meis, Marl, Kreis Recklinghausen, Germany; vested in the Alien Property Custodian No Drawing. Application July 30, 1941, Serial No. 404,618. In Germany June 26, 1940

2 Claims. (Cl. 260—50)

The present invention relates to new polymerization products and to a process of preparing the same. It is known that aromatic vinyl compounds such as styrene if subjected to the action of heat or of polymerization catalysts are converted into high molecular products of a chain-like structure. In case the polymerization of such aromatic vinyl compounds is effected in the presence of other polymerizable or copolymerizable compounds there are obtained mixed polymerizates containing both types of starting materials in any desired proportion and alteration. Now, the U. S. Patent 2,224,837 to Leo Rosenthal and one of us has taught that a new type of polymerizate can be prepared by causing acid reacting polymerization catalysts to react upon a mixture of aromatic vinyl compounds with aromatic hydroxy compounds and/or alkyl ethers thereof. From the French Patent No. 69,620 (patent of addition to No. 804,891) it follows that similar products can be obtained by employing as catalysts the so-called bleaching earths such as "fuller's earth." Depending on the conditions of working and on the proportions of the starting materials the polymeric products thus obtained represent viscous difficultly volatile oils or solid substances of a resin-like character. The outstanding feature of most of the resin-like products of the character described is their being soluble in the usual lacquer benzene, in oil of turpentine and in drying or nondrying oils. Part of the said polymerization products are even capable of being homogeneously combined with polymerized oils. In these respects, the said new products are clearly differentiated from the hitherto known polymerized aromatic vinyl compounds and from mixed polymerizates containing the same. Hence it follows that the said new products can be employed as additional substances for the preparation of lacquers such as oil varnishes and so on. Moreover, the said new products are capable of reacting with formaldehyde, new condensation products of an increased molecular weight being obtained thereby.

In accordance with the present invention aromatic vinyl compounds, i. e. aromatic compounds which are substituted by the radical CH₂=CH— are capable of being converted into new polymerization products which in chemical structure and in physical behaviour resemble those of the U. S. Patent 2,224,837 mentioned above by subjecting the same in the absence of water to the action of acid reacting polymerization catalysts in the presence of such aldehydes or ketones as have the carbonyl group conjugated with a C—C double linkage. In accordance with what is stated in the French patent mentioned above the acid reacting catalyst can be replaced by bleaching earths such as fuller's earth. Examples for suitable aromatic vinyl compounds are styrene, vinyl naphthalene, divinyl benzene and vinyl anisol. As aldehydes or ketones of the character described there can be employed vinyl methyl ketone, crotonaldehyde, cinnamic aldehyde, benzaldehyde, acetophenone and benzoquinone, it being to be understood that the unsaturated C—C double linkage which must be conjugated with the carbonyl group may be of an aliphatic or aromatic nature. Attention is directed to the fact that part of the said carbonyl compounds, such as vinyl methyl ketone, are capable of being polymerized whereas others such as benzaldehyde are not. Under the influence of the catalysts described these products in admixture with the aromatic vinyl compounds are converted into polymeric products which are believed to contain a chain of the usual polystyrene type, the aldehydes or ketones representing the terminal members thereof. In accordance therewith the molecular weight of our new polymerization products increases with a decrease of the proportion of the aldehydes or ketones, there being practically no lower limit for the latter. On the other hand, the aldehydes and ketones are not capable of reacting with the aromatic vinyl compounds in a higher proportion than that corresponding to one carbonyl group per each one vinyl group. In case a higher proportion of aldehydes or ketones of the character described is employed, the aqueous aldehydes and ketones can be recovered for the most part in an unchanged state.

The reaction is preferably carried out in the presence of an indifferent solvent such as carbon tetrachloride, benzene or toluene. Depending on the starting materials and on the catalysts employed the reaction mixture must be heated or heat is evolved during reaction so that the mixture must be cooled. As catalysts there can be employed for instance tin tetrachloride, ferric chloride or borofluoracetic acid. Generally speaking, all acid reacting polymerization catalysts are suitable for the purpose in question. The reaction being finished the catalyst can be removed by treating the reaction mixture with water or with alkali or earth alkali metal oxides, hydroxides or carbonates. In case bleaching earths are employed as catalysts the reaction mixture can be worked up by removing the same by filtration.

Depending on the nature and the proportion of the starting materials our new products can be employed for various purposes. The high molecular products, i. e. those containing in chemical combination a relatively low proportion of aldehydes or ketones of the character described can be employed as such or as additional substances for the preparation of lacquers, oil varnishes and the like. In general, such products should not contain less than one carbonyl group per about 100 vinyl groups. Low molecular polymerizates, i. e. those containing in chemical combination a relatively high proportion of aldehydes and ketones of the character described can partially be employed for similar purposes. Others can be employed as starting materials for other reactions, for instance for reaction with formaldehyde, valuable products of an increased molecular weight being obtained thereby.

As a matter of fact, there can also be employed mixtures of various aromatic vinyl compounds and/or mixtures of various aldehydes and/or ketones of the character described as well as mixtures of such aldehydes and/or ketones with phenols or phenol ethers, i. e. the starting materials of the U. S. Patent 2,224,837.

The following examples illustrate the invention without restricting it thereto, the parts being by weight:

Example 1

A mixture of 208 parts of styrol and 140 parts of crotonaldehyde is diluted with 400 parts of xylene. To the said mixture there is gradually added such an amount of borofluoracetic acid as is sufficient to effect an increase of temperature. Then the temperature is kept at 40° C. by gradually adding further amounts of catalyst. When by the addition of catalysts no increase of temperature is observed any longer, the mixture is stirred for a short time to 100° C. Thereupon the borofluoracetic acid is neutralized by adding ground soda to the reaction mixture. After filtration the clear solution is freed from the solvent and smaller quantities of highly boiling ingredients. There remain 340 parts of a resin which is viscous when warm and solid at room temperature and is soluble in benzene, toluene, carbon tetrachloride, xylene, acetone and linseed oil.

Example 2

To 104 parts of styrene and 105 parts of benzaldehyde in 200 parts of xylene there are gradually added at a temperature of about 30 to 40° C. 30 parts of borofluoracetic acid. By suitable cooling the reaction temperature is kept within these limits. The reaction being finished the solution is treated with a mixture of calcium oxide and soda, until a test portion which has been filtered and shaken with water no longer shows an acid reaction in the aqueous layer. Thereupon the filtered solution is worked up as described in Example 1. There are obtained 205 parts of a light yellow resin which is soluble in benzene, toluene, xylene, acetone, carbon tetrachloride and linseed oil. It is insoluble in alcohol.

Example 3

104 parts of styrene and 11 parts of benzaldehyde are diluted with 200 parts of xylene and condensed by gradually adding thereto borofluoracetic acid. By working up as described in the foregoing examples there are obtained 114 parts of a nearly colorless resin which is soluble in linseed oil even at a temperature of 0° C.

Example 4

104 parts of styrene and 60 parts of acetophenone are diluted with 200 parts of xylene and gradually mixed with 15 parts of tin tetrachloride at a temperature of between 20 and 40° C. The reaction being finished the mixture is stirred for several hours and then the catalyst is removed by treating the reaction mixture with a mixture of sodium and calcium carbonate. There remain 130 parts of a soft resin.

Example 5

In the presence of 200 parts of xylene there are caused to react with each other 104 parts of styrene and 20 parts of benzoquinone by gradually adding thereto 25 parts of borofluoracetic acid within 1½ hours at a temperature of 40° C. The catalyst is removed by stirring with soda and filtration. After evaporation of the solvent and of a small amount of high-boiling condensates there remains a resin which is soluble in benzene, carbon tetrachloride, xylene, toluene and linseed oil.

Example 6

200 parts of xylene are diluted with 100 parts of styrene and 100 parts of acetophenone, whereupon 40 parts of borofluoracetic acid are added thereto within 1½ hours. The reaction being finished the mixture is stirred for 8 hours at 90° C. The catalyst is removed as described in one of the foregoing examples and the filtered reaction mixture is heated in vacuo until at 10 mm. and 210° C. there is no longer any evaporation. There remain 160 parts of an oil which is very viscous at room temperature.

Example 7

50 parts of fuller's earth are heated with a mixture of 100 parts of styrene, 70 parts of benzaldehyde and 200 parts of xylene for 8 hours at a temperature of 90–100° C. After cooling the fuller's earth is filtered off and the solution evaporated. After removal of the solvent, the non-reacted substance and a small amount of high-boiling condensation products there remain 140 parts of a viscous oil which is miscible with benzene, toluene, xylene and linseed oil.

Example 8

104 parts of styrene and 63 parts of α-ethyl-β-propyl acrolein are gradually mixed with 300 parts of carbon tetrachloride and 30 parts of borofluoracetic acid and then the mixture is stirred for several hours at 70° C. Thereupon the reaction mixture is cooled and neutralized with 50 parts of soda at room temperature while stirring. After filtration the solution is freed from the solvent by distillation. There remain 160 parts of a sticky and soft resin.

Example 9

100 parts of styrene and 13 parts of cinnamic aldehyde in 200 parts of toluene are condensed with borofluoracetic acid at 40° C. After neutralization, filtration and removal of the solvent and of high-boiling condensation products there is obtained a yield of 110 parts of a light yellow hard resin which is soluble in linseed oil, benzene and carbon tetrachloride.

Example 10

A solution of 104 parts of styrene, 50 parts of benzaldehyde and 25 parts of acetophenone in 200 parts of xylene is condensed with 20 parts of borofluoracetic acid at 40° C. By stirring at room temperature with a mixture of calcium oxide and calcium carbonate the reaction mixture is neutralized. After filtration the solvent is distilled off and the remainder is heated to 210° C. at 10 mm. pressure. There remain 165 parts of a light yellow resin which is very hard.

Example 11

Into a mixture of 100 parts of divinyl benzene, 50 parts of benzaldehyde and 200 parts of benzene there are gradually added 20 parts of borofluoracetic acid. Thereupon the mixture is heated to boiling for about 3 hours. Then the catalyst is neutralized by digesting the mixture with free calcium oxide. After filtration and after evaporation of the solvent in vacuo there are obtained 145 parts of a light colored resin, which is soluble in benzene, xylene, toluene and in linseed oil.

Example 12

Into a mixture of 200 parts of styrene, 10 parts of phenol, 20 parts of acetophenone and 200 parts of benzene there are gradually added 5 parts of borofluoracetic acid. Then the mixture is heated to boiling for several hours, whereupon the catalyst is neutralized as described in the foregoing example and the solvent is evaporated. There are obtained 200 parts of a light colored resin of the softening point: 86° C., which is soluble in linseed oil.

Example 13

In case in Example 12 the phenol is replaced by 11 parts of phenoxyethanol, there are obtained 220 parts of a light colored resin which is soluble in linseed oil and shows the softening point: 80° C.

Example 14

Into a mixture of 104 parts of styrene, 10 parts of benzaldehyde, 12 parts of acetophenone and 200 parts of toluene there are gradually added 10 parts of borofluoracetic acid. The reaction being finished the mixture is stirred for a short time at 80° C., whereupon the catalyst is neutralized. After filtration and evaporation of the solvent there are obtained 121 parts of a light colored resin of the softening point: 83° C.

Example 15

Into a solution of 104 parts of styrene, 10 parts of benzaldehyde, 10 parts of acetophenone and 200 parts of xylene there are added at 90° C. while stirring 40 parts of an active aluminium hydroxide. The reaction being finished the mixture is stirred for several hours at 100° C. After filtration and removal of the solvent there are obtained 120 parts of a soft resin with a softening point of below 60° C.

Example 16

A mixture of 15.8 parts of $\beta$-naphthoquinone and 104 parts of styrene is diluted with such an amount of benzene as to yield a solution which is clear at 40° C. At this temperature there are added 4 parts of borofluoracetic acid, whereupon the mixture is heated for 3 hours to 40° C. After neutralization by means of 40 parts of anhydrous sodium carbonate and after the addition of 10 parts of a bleaching earth the mixture is filtered and the solvent is evaporated. There are obtained 100 parts of a brownish colored hard resin.

We claim:

1. The process which comprises causing polymerization catalysts selected from the group consisting of bleaching earths and acid reacting substances to react upon aromatic compounds which are nuclearly substituted by the radical $CH_2=CH-$ in the absence of water and in the presence of such ketones as have the carbonyl group conjugated with a $C=C$ double linkage and in the presence of an oxygen-containing compound selected from the group consisting of phenols and phenolalkylethers.

2. The process of claim 1 wherein the ketone is $C_6H_5COCH_3$.

ULLRICH HOFFMANN.
HELMUT MEIS.